United States Patent [19]

Shapero et al.

[11] Patent Number: 5,258,068
[45] Date of Patent: Nov. 2, 1993

[54] PLAY MATERIAL COMPOSITION

[75] Inventors: Wallace H. Shapero, West Hills; Susan A. Reyes, Agoura Hills, both of Calif.

[73] Assignee: Mattel, Inc., El Segundo, Calif.

[21] Appl. No.: 823,399

[22] Filed: Jan. 21, 1992

[51] Int. Cl.⁵ .......................... C09D 105/00
[52] U.S. Cl. .................................. 106/208
[58] Field of Search ........................ 106/208

[56] References Cited

U.S. PATENT DOCUMENTS

| | | |
|---|---|---|
| 2,541,851 | 2/1951 | Wright . |
| 3,384,498 | 5/1968 | Ahrabi ........................... 106/208 |
| 3,565,815 | 2/1971 | Christy . |
| 3,634,280 | 1/1972 | Dean et al. . |
| 3,661,790 | 5/1972 | Dean et al. . |
| 3,804,654 | 4/1974 | Liu . |
| 3,873,485 | 3/1975 | Fichera . |
| 4,076,547 | 2/1978 | Lester et al. . |
| 4,172,054 | 10/1979 | Ogawa et al. . |
| 4,299,790 | 11/1981 | Greenberg ..................... 106/209 |
| 4,624,976 | 11/1986 | Amano et al. .................. 524/13 |
| 4,701,329 | 10/1987 | Nelson et al. ................. 426/74 |
| 4,735,660 | 4/1988 | Cane ............................ 106/208 |

*Primary Examiner*—David Brunsman
*Attorney, Agent, or Firm*—Roy A. Ekstrand

[57] ABSTRACT

A safe non-toxic play material is formed of guar gum, EDTA, DOWICIL 200, methylparaben and propylparaben together with a monosodium phosphate calcium buffer. A glycerin and colorant mixture is combined with the remaining ingredients to complete the play material.

7 Claims, 1 Drawing Sheet

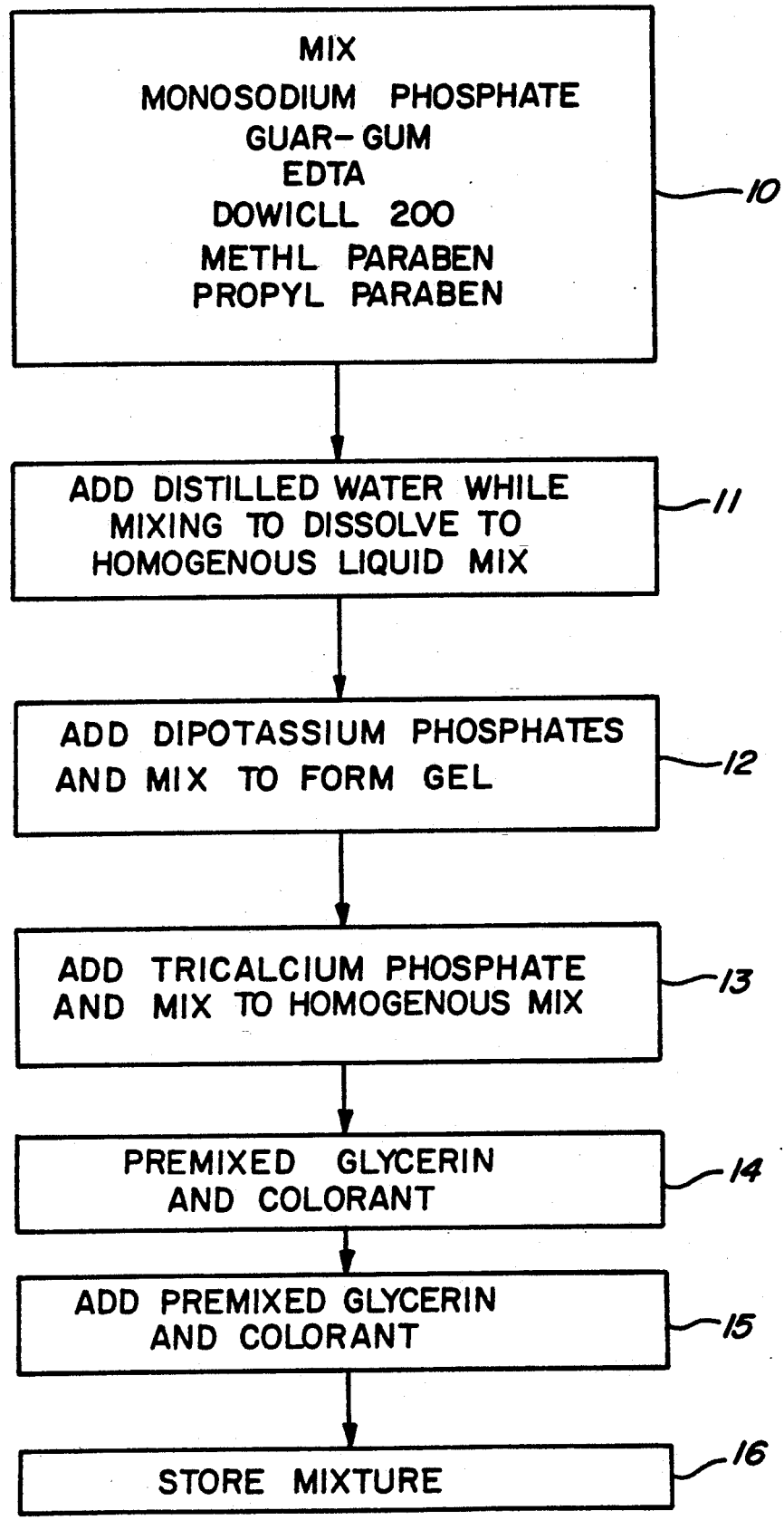

PLAY MATERIAL COMPOSITION

FIELD OF THE INVENTION

This invention relates generally to play material compositions and particularly to those intended for available for use by young children.

BACKGROUND OF THE INVENTION

Play compositions of different types have been provided by practitioners in the toy arts through the years to amuse children and adults and to aid in the development of manual skills and dexterity as well as creativity. While the variety of such play material compositions is virtually endless, all generally involve the use of free-forming or malleable materials such as oil base or water base gums and gel compounds which may be manipulated and shaped by the user. Certain materials have been provided which are moldable and tend to retain their shapes such as modeling clay or the like. Others, however, have been provided which are looser and more free-flowing such as novelty play materials and compositions. Still others are gel-like and provide interesting characteristics such as shaking or quivering similar to gelatin dessert products.

Regardless of the type of play material compounds used, it has remained imperative that such materials be safe for young children. Safety requirements have evolved through the years as concerns have grown. Generally safety requirements mandate that play material compositions be non-irritating to the skin or eyes or the like and be non-toxic if ingested. Additional requirements have been employed in certain materials to avoid damage to clothing, upholstery fabric or carpeting.

The continuing need for evermore improved and varied play material compositions has prompted practitioners in the art to develop a great number of such materials. For example, U.S. Pat. No. 2,541,851 issued to Wright sets forth a PROCESS FOR MAKING PUTTYLIKE ELASTIC PLASTIC SILOXANE DERIVATIVE COMPOSITION CONTAINING ZINC HYDROXIDE in which a composition of matter comprises a dimethyl silicone of the type generally known as a "bouncing putty". The invention is directed to a process for making such bouncing putties by treating the dimethyl silicone with a compound of boron preferably followed by further treatment using head and/or a catalyst.

U.S. Pat. No. 3,384,498 issued to Ahrabi sets forth a PLASTIC MODELING COMPOSITION comprising manogalactan gum, alkali metal borate, boric acid, high molecular weight polysaccharide, bacteriostat, fungistat, filler, colorant and perfume.

U.S. Pat. No. 3,565,815 issued to Christy sets forth a PHOSPHOR CONTAINING PLASTIC POLYSTYRENE which provides a moldable plastic product having adhesive properties and which may made to glow in the dark.

U.S. Pat. No. 3,634,280 issued to Dean, et al. sets forth a GLOWING BOUNCING PUTTY in which a non-toxic novelty composition comprises a bouncing putty material possessing unusual properties such as the ability to glow in the dark after exposure to a light source. The putty composition is preferably formed of a solid gel-like heat reaction product of dimethyl silicone oil with a minor portion of a boron compound. In its preferred form, the material is subsequently treated with heat or a catalyst.

U.S. Pat. No. 3,661,790 issued to Dean, et al. sets forth a GLOWING BOUNCING PUTTY similar to that set forth in the above-referenced U.S. Pat. No. 3,634,280.

U.S Pat. No. 3,804,654 issued to Liu sets forth a MODELING COMPOSITION formed of material fillers such as clay and talc together with hydrocarbon petroleum distillate oil, waxy paraffinic hydrocarbon oil, a liquid silicone compound, an astringent, a humectant, glue and water. The composition is moldable and shapable when initially mixed and properly stored but ultimately takes a permanent set after a predetermined cure time.

U.S. Pat. No. 3,873,485 issued to Fichera sets forth a MOLDABLE AQUEOUS PLASTIC MASS OF POLYETHYLENE OXIDE FUMED SILICA AND POLYGLYCOL which is formable into a plastic mass useful as an entertaining and educating medium. The mass is non-newtonian, has low internal rebound and is thixotropic and may be formed into window glass which is extremely strong and impact resistant.

U.S. Pat. No. 4,076,547 issued to Lester, et al. sets forth a POLYMERIC MOLDING COMPOSITION formed from water soluble compounds admixed from a two part wet phase and dry phase combination comprised from the interaction by nucleophilic substitution of a hydroxyl group of an alcohol.

U.S. Pat. No. 4,172,054 issued to Ogawa, et al. sets forth a MODELING COMPOSITION FOR CRAFT WORKS AND A METHOD FOR THE PRODUCTION THEREFOR in which an improved modeling compound of a soft pliable working consistency formable into any desired shape is provided which is relatively fast drying to assume a permanent shape. A small amount of dibutyl hydroxy-toluene or butyl hydroxy-anisole or both is included in the composition.

U.S. Pat. No. 4,229,790 issued to Greenberg sets forth a METHOD AND COMPOSITION FOR FORMING A PLASTER OBJECT for use in the formation of toy figures and the like. The molding powder mixture includes calcium sulphate hemihydrate combined with xanthan gum. The material once formed dries to form a porous lightweight object.

U.S. Pat. No. 4,624,976 issued to Amano, et al. sets forth a MODELING MATERIAL COMPOSITION comprising a synthetic resin and a wooden powder together with an oil formulation. The synthetic resin is a rubber reinforced styrene resin. The oil used is a hydrocarbon oil utilizing an aromatic ring forming carbon.

U.S. Pat. No. 4,735,660 issued to Cane sets forth a CROSS-LINKED GEL MODELING COMPOSITION capable of assuming various colors which is cohesively strong but pliable and ductile. The compound is formed by combining a wood flower to a water-based gel using cross linkable guar gum as a gellant.

U.S. Pat. No. 4,701,329 issued to Nelson, et al. sets forth a CALCIUM FORTIFIED MILK in which a fortified milk formula is made by the addition of a tribasic calcium phosphate, carrageenan and guar gum combined with fresh milk.

While certain of the foregoing described play material compositions have enjoyed some commercial success and provided amusement and entertainment, there remains a continuing need in the art for evermore improved and varied play material compositions.

SUMMARY OF THE INVENTION

Accordingly, it is a general object of the present invention to provide an improved play material composition. It is a more particular object of the present invention to provide an improved play material composition which exhibits a novel handling characteristic and tactile feel. It is a more particular object of the present invention to provide an improved play material composition which may be safely and comfortably handled by young children and is harmless if ingested.

In accordance with the present invention, there is provided a play material composition consisting essentially of by weight 1.0 percent monosodium phosphate; 2.50 to 5.50 percent guar gum; 0.1 to 0.2 percent EDTA; 0.1 to 0.2 percent DOWCIL 200; 0.01 to 0.1 percent methylparaben; 0.01 to 0.1 percent propylparaben; 5.0 to 7.00 percent dipotassium phosphate; 0.1 to 5.0 percent tricalcium phosphate; 0.1 to 5.0 percent glycerin; and water as needed.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawing, in the figure of which like reference numerals identify like elements and in which:

FIG. 1 sets forth a flow diagram of the manufacturing process for the present invention play material composition.

DESCRIPTION OF THE PREFERRED EMBODIMENTS

The present invention play material composition provides a play material which is unique in its physical properties and tactile characteristics. The material is malleable and extrudable while simultaneously being cohesive and elastic. For example, the material may be formed into a planar member and inflated much like a balloon or the like. The present invention play material composition clings or adheres to itself and is easily removed from cloth fabric or other similar materials.

The basic material is formed of a guar gum which is dissolved in an acidic phosphate salt to form a liquid. The liquid is then formed into a gel by adding dipotassium phosphate. The gel formed is suitable for used as a play material when so formulated. However, it has been determined that a potential safety problem arises in the basic mixture due to the phosphates therein. Such phosphates tend to absorb calcium when ingested and thus may present a safety hazard. The present invention overcomes this potential safety hazard by the further addition of a calcium phosphate compound to provide available calcium to buffer the calcium absorption which would otherwise take place within the body upon ingesting the compound.

The preferred combination of ingredients for formulating the present invention play material composition include distilled water, monosodium phosphate, a self cross linking guar gum, EDTA, DOWCIL 200, a preservative comprising 95 w/w % cis-1-(3-Chloroally)-3,5,7-triaza-1-azoniaadamantane chloride, 4 w/w % Hexamethylenetetramine hydrochloride and, 1 w/w % water methylparaben, propylparaben, dipotassium phosphate, tricalcium phosphate, colorant as needed, and glycerin. In its preferred form, the present invention play material is formulated to provided a firmer, more easily handled compound. Thus, while substantial variation of the relative amounts of ingredients may be utilized, it has been found desirable to include a sufficient amount of tricalcium phosphate to provide the desired firmness with the compound. However, it has been recognized that the formulation of the above ingredients may be carried forward using a smaller proportion of tricalcium phosphate and a higher proportion of glycerin to achieve a looser, more free-flowing material in certain applications.

The present invention play material composition is preferably formulated using the ingredients and percentages thereof in accordance with the formula set forth below as Table I.

TABLE I

| INGREDIENTS | PREFERRED |
| --- | --- |
| DISTILLED WATER | q.s. to 100 |
| MONOSODIUM PHOSPHATE | 1.00 |
| SELF CROSS-LINKING GUAR GUM | 3.40 |
| EDTA | 0.19 |
| DOWICIL 200 | 0.14 |
| METHYLPARABEN | 0.05 |
| PROPYLPARABEN | 0.04 |
| DIPOTASSIUM PHOSPHATE | 6.25 |
| TRICALCIUM PHOSPHATE | 9.25 |
| COLORANT | 2.30 |
| GLYCERIN (99%) | 1.50 |

As mentioned, this preferred formula is selected primarily to achieve the desired tactile properties and the degree of firmness which permits the present invention play material composition to be readily handled by young children and the like. However, it is recognized as also mentioned above that it may be desirable in certain applications to vary the relative proportions of ingredients from that set forth in Table I as the preferred formulation to achieve different firmness and consistency for other physical property variation. Thus, Table II below sets forth the formula for the present invention play material composition showing the suggested ranges of several ingredients.

TABLE II

| INGREDIENTS | % |
| --- | --- |
| DISTILLED WATER | q.s. to 100 |
| MONOSODIUM PHOSPHATE | 1.00 |
| SELF CROSS-LINKING GUAR GUM | 2.50–5.50 |
| EDTA | 0.19 |
| DOWACIL 200 | 0.14 |
| METHYLPARABEN | 0.05 |
| PROPYLPARABEN | 0.04 |
| DIPOTASSIUM PHOSPHATE | 5.0–6.50 |
| TRICALCIUM PHOSPHATE | 9.00–18.00 |
| COLORANT | 1.00–5.00 |
| GLYCERIN (99%) | 0.50–5.00 |

As mentioned above, the most frequently anticipated variation of formula for the present invention play material composition will likely be the variation of the relative percentages of tricalcium phosphate and glycerin to adjust the firmness or looseness of the material as desired. It will be apparent to those skilled in the art, however, that additional material may be added to the formulations set forth above in Tables I and II to impart additional properties to the present invention material.

FIG. 1 sets forth a flow diagram of the preferred manufacturing process for the present invention play material shown in Tables I and II. Specifically, the process begins with the initial mixing of guar gum EDTA, DOWICIL 200, methylparaben, propylparaben together with monosodium phosphate. The monosodium phosphate is an acidic phosphate salt and is operative upon the guar gum to dissolve the guar gum and associated ingredients to a generally liquid consistency. The active agent in this dissolving and mixing process is the acidic pH of the monosodium phosphate salt in producing a liquid mix. The process then moves to a step 11 in which distilled water is added either following or during the dissolving process to produce a homogenous liquid mix. Thereafter, the process moves to step 12 in which dipotassium phosphate is added to the mixture to form a gel. The gel-forming process at step 12 results from the alkaline pH of the dipotassium phosphate. The thickness of the gel formed at step 12 is largely a function of the pH of the resulting mixture. Once the gel is formed, the process moves to step 13 in which tricalcium phosphate is added and the resulting combination mixed to a homogenous mixture. As mentioned above, tricalcium phosphate is added primarily to provide the desired buffer which prevents calcium absorption should the play material be ingested. In addition, tricalcium phosphate also affects the pH of the mixture and thus is also instrumental in achieving the desired firmness or looseness of the gel mix. Once the desired firmness has been achieved at step 13, the process moves to step 14 in which the glycerin and colorant materials are premixed apart from the remainder of ingredients. Thereafter, the premixed glycerin and colorant materials are added to and mixed within the remainder of ingredients to form the completed play material. As mentioned above, it is recognized that other materials such as a fragrance or the like may be added to the basic material set forth in the examples above and the discussions relating to FIG. 1. The resulting play material is then stored at step 16 to await use.

What has been shown is a novel and highly amusing and entertaining play material composition which may be formed to virtually any desired firmness to suit the user'needs. The material exhibits elastic properties and is formable and extrudable. In addition, the material is cohesive and tends to adhere to itself making clean-up of the material and its removal from clothing and other fabric relatively simple and trouble free. The material maybe colored using conventional colorants and may be used in combination with conventional fragrances or the like. Because the material is a water based material, very little, if any, problems of oil spotting or grease marking are encountered in the use of the product. The use of a calcium buffer within the mixture provides a safety protection against calcium absorption should the material be ingested. Thus, the material is non-toxic and because of its water-based character is non-irritating to the skin.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. A play material composition consisting essentially of by weight 1.0 percent monosodium phosphate; 2.50 to 5.50 percent guar gum; 0.1 to 0.2 percent EDTA; 0.1 to 0.2 percent of a preservative comprising 95 w/w % cis-1-(3-Chloroallyl)-3,5,7-triaza-1azoniaadamantane chloride, 4 w/w % Hexamethylenetetramine hydrochloride and, 1 w/w % water; 0.01 to 0.1 percent propyl paraben; 5.0 to 7.00 percent dipotassium phosphate; tricalcium phosphate in an amount sufficient to provide the desired buffer effective to prevent calcium absorption should the play material be injested, 0.1 to 5.0 percent glycerin; and water as needed.

2. A play material composition as set forth in claim 1 further including essentially 1.0 to 5.00 percent by weight of a colorant.

3. A play material composition as set forth in claim 1 wherein the guar gum is about 3.40 percent by weight.

4. A play material composition as set forth in claim 1 wherein said dipotassium phosphate is about 6.25 percent by weight.

5. A play material composition as set forth in claim 1 wherein said tricalcium phosphate is about 9.25 percent by weight.

6. A play material composition as set forth in claim 1 wherein said glycerin is about 1.50 percent by weight.

7. A play material composition wherein the composition includes, by weight:

| | |
|---|---|
| DISTILLED WATER | q.s. to 100 |
| MONOSODIUM PHOSPHATE | 1.00 |
| SELF CROSS-LINKING GUAR GUM | 3.40 |
| EDTA | 0.19 |
| a preservative comprising 95 w/w % cis-1-(3-Chloroallyl)-3,5,7-triaza-1-azoniaadamantane chloride, 4 w/w % Hexamethylenetetramine hydrochloride and, 1 w/w % water | 0.14 |
| METHYLPARABEN | 0.05 |
| PROPYLPARABEN | 0.04 |
| DIPOTASSIUM PHOSPHATE | 6.25 |
| TRICALCIUM PHOSPHATE | 9.25 |
| COLORANT | 2.30 |
| GLYCERIN | 1.50 |

* * * * *